3,240,806
PROCESS FOR PRODUCING A MIXTURE OF UNSATURATED ALIPHATIC ACIDS AND ALDEHYDES
James Robert Bethell and David James Hadley, Epsom Downs, England, assignors to The Distillers Company Limited, Edinburgh, Scotland, a company of Great Britain
No Drawing. Filed Apr. 17, 1963, Ser. No. 273,563
5 Claims. (Cl. 260—533)

The present invention relates to the production of unsaturated aliphatic acids and aldehydes, and in particular to the production of acrylic or methacrylic acid, the corresponding aldehydes, or mixtures of the acids and aldehydes from propylene or isobutene.

The application is a continuation-in-part of our pending U.S. applications Serial Nos. 4,218 (now Patent No. 3,098,102) and 4,221, both dated January 25, 1960.

According to the present invention, the process comprises reacting at an elevated temperature in the vapour phase an olefine selected from the group consisting of propylene and isobutene with molecular oxygen in the presence of a catalyst selected from the group consisting of cobalt molybdate with elemental tellurium and cobalt molybdate with a tellurium oxide, to produce a product selected from the group consisting of acrylic acid, methacrylic acid, acrolein and methacrolein, and mixtures of each acid with its said corresponding aldehyde.

The preferred starting material is propylene, which is oxidised to a mixture of acrylic acid and acrolein. Correspondingly, isobutene is oxidised to a mixture of methacrylic acid and methacrolein.

The term "cobalt molybdate" as used in the appended claims is defined as (i) a mixture of the oxides of molybdenum and cobalt, and/or (ii) a compound of molybdenum, cobalt and oxygen. The catalyst also includes tellurium, e.g. as elemental tellurium or as tellurium oxides, and may if desired be deposited on a support such as alumina or silica. The cobalt molybdate portion of the catalyst may be conveniently prepared, for example, by precipitation from mixed solutions of cobalt and molybdenum salts. The cobalt molybdate is suitably prepared, for example, by mixing an aqueous solution of a cobalt salt with an aqueous solution or suspension of molybdic acid or a molybdic acid salt, adding ammonia or a water-soluble aliphatic amine such as ethanolamine to the aqueous mixture, drying the resulting precipitate, and heating it to a temperature in the range 400 to 700° C. A variation of this method is to form an aqueous solution of a cobalt salt and ammonium molybdate, heating the mixture until a precipitate forms, drying the precipitate and subjecting it to a heat treatment as before. Another method of preparing the catalyst consists in adding ammonia or a water-soluble amine to an aqueous solution of a cobalt salt, and mixing the resulting precipitate with molybdic acid or a salt of molybdic acid with a volatile base either as such or as a solution or suspension, for instance in water, the mixture then being evaporated to dryness and subjected to heat treatment as described above.

The ratio of cobalt to molybdenum in the catalyst may vary within moderately wide limits, but it is preferred to use an atomic ratio not substantially greater than 1:1.

The tellurium portion of the catalyst may be introduced in various ways. Thus the oxidation catalyst itself may initially contain elemental tellurium or a tellurium oxide, or alternatively elemental tellurium or a tellurium oxide may be supplied to the reaction with the reactant feed. Also a combination of both embodiments may be employed whereby tellurium vaporised from a tellurium-containing catalyst is replaced by fresh elemental tellurium or a tellurium oxide introduced with the reactant feed.

Tellurium-containing catalysts may be prepared, for instance, by mixing tellurium, an oxide of tellurium or a decomposable salt of tellurium with cobalt molybdate prepared as described above. Suitable decomposable salts of tellurium are tellurides, such as cobalt telluride. A preferred catalyst is tellurium dioxide mixed with cobalt molybdate.

The supply of elemental tellurium or an oxide of tellurium as a vapour mixed with the reactant feed may be carried out, for instance, by passing part or all of the reactant feed over elemental tellurium maintained at an elevated temperature, suitably the reaction temperature. Alternatively, one component of the feed, e.g. an inert diluent, may be passed over the tellurium and subsequently combined with the remainder of the feed.

The amounts of tellurium used in the process can vary within very wide limits. Where the tellurium is incorporated in the oxidation catalyst itself, the catalyst may contain, for instance, from 0.1 to 50% by weight of tellurium, expressed as elemental tellurium. Where the tellurium is supplied as a vapour mixed with the reactant feed, only traces of tellurium in the reaction mixture are necessary to catalyse the reaction, for instance between $1 \times 10^{-5}$ and $1 \times 10^{-2}$ grams of tellurium per litre of reaction mixture, and preferably between $1 \times 10^{-4}$ and $1 \times 10^{-3}$ grams of tellurium per litre.

The reaction of propylene or isobutene with oxygen over the catalyst may be carried out in any suitable manner, for instance as a fixed bed process, or as a fluidised bed process.

The proportion of olefine in the feed may vary within fairly wide limits, for example between 1 and 20% by volume. It is preferred to use between about 2 and 10% by volume of the olefine.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, preferably between 300 and 500° C.

The contact time may be, for example, in the range 1–30 seconds.

The unsaturated acid and aldehyde may be recovered from the reaction products in any suitable manner, for example by countercurrent extraction with water, preferably at an acid pH followed by fractional distillation. Alternatively the unsaturated acid alone may be recovered and the unsaturated aldehyde recycled to the reactor.

The process of the invention is further illustrated with reference to the following examples in which the parts by weight and parts by volume bear the same relation to each other as do grams to millilitres.

EXAMPLE 1

Ammonium molybdate (176.6 parts by weight) was dissolved in 200 parts by volume of distilled water. 83 parts by volume of ammonia (specific gravity 0.880) were added to the ammonium molybdate solution at 60° C. Cobalt nitrate hexahydrate (291.1 parts by weight) dissolved in 300 parts by volume of distilled water was added slowly with stirring to the ammoniacal solution of ammonium molybdate, maintaining the temperature to about 60° C. Stirring was continued for 15 minutes after the addition of cobalt nitrate solution was complete. The suspension of cobalt molybdate was allowed to stand overnight, filtered, washed with water, dried and ground to a powder.

The cobalt molybdate was then milled with tellurium dioxide in 1:1 molar ratio, pelleted and heated in air at 400° C. for 4.5 hours.

The cobalt molybdate/tellurium dioxide catalyst was placed in a reactor maintained at 383° C. A gas mixture comprising 6% by volume of propylene, 43% by volume of steam and 51% by volume of air was passed over the catalyst, the contact time being 4 seconds. The acrolein and acrylic acid were recovered from the reaction products by scrubbing with water followed by fractional distillation of the water solution.

55.1% of the propylene fed was converted to acrolein, 24.0% to acrylic acid and 5.4% to carbon dioxide. 10.9% of the propylene was recovered unchanged. Based on the propylene consumed the yield of acrolein was 62% and the yield of acrylic acid was 27%.

EXAMPLE 2

The process described in Example 1 was repeated except that the propylene feed was replaced with isobutene.

A gas mixture comprising 2.1% by volume of isobutene and 97.9% by volume of air was passed over the catalyst in a reactor maintained at 345° C., the contact time being 4 seconds.

Of the isobutene fed, 32.4% was converted to methacrolein, 3.5% to methacrylic acid, 19.7% to carbon dioxide and 22.1% was recovered unchanged. The yield of methacrolein based on isobutene consumed was 37.5%.

EXAMPLE 3

A gas mixture comprising 3.1% by volume of isobutene and 96.9% by volume of air was passed over the catalyst described in Example 1 maintained in a reactor at 350° C., the contact time being 4 seconds.

Of the isobutene fed, 13.9% was converted to methacrylic acid, 25.0% to methacrolein and 24.1% to carbon dioxide. 1.4% of the isobutene was recovered unchanged. The yield of methacrylic acid based on isobutene consumed was 14%.

EXAMPLE 4

A solution of cobalt nitrate (291 parts by weight) in water (300 parts by volume) was added to a solution of ammonium molbdate (177 parts by weight) in water (200 parts by volume) and to this well-stirred mixture ammonia solution (80 parts by volume of 0.880 ammonia in 80 parts by volume of water) was added dropwise. The precipitate was collected and thoroughly washed with water. It was then dried and decomposed by heating until ammonia ceased to be evolved.

The granules were then heat treated at 640° C. for 16 hours and sieved to 8 to 16 mesh BSS. 26 parts by weight of the catalyst, which had a ratio of Mo:Co of 1.07:1, were intimately mixed with 0.04 part by weight of tellurium dioxide.

A gaseous mixture of 9.9% by volume of propylene, 49.4% by volume of air and 40.7% of steam were passed over the catalyst maintained in a reactor at 450° C., the contact time being 4.03 seconds.

Of the propylene fed to the reactor, 24.4% was converted to acrylic acid, 5.15% to acrolein, 3.75% to carbon dioxide and 57.9% was recovered unchanged. The yield of acrylic acid based on propylene consumed was 58.1%.

EXAMPLE 5

Cobaltous nitrate (291 parts by weight) was dissolved in distilled water (120 parts by volume) and the solution heated to 60° C. Ammonium molybdate (176.6 parts by weight) was dissolved in distilled water (520 parts by volume) at 60° C., and the two solutions were quickly mixed and well stirred. Aqueous ammonia (5.0 N, 270 parts by volume) was added dropwise over 30 minutes, the temperature of the mixture being kept at 55° to 60° C., and the pH of the mixture not exceeding 7.0 during the precipitation. The mixture was stirred for a further 15 minutes, and the precipitate was filtered and washed twice by re-suspension in distilled water ($2 \times 750$ parts by volume). The precipitate was dried at 110° C., ground to about 8 mesh BSS and heated in air at 400° C. for 16 hours. The catalyst was then ground to pass a 30 mesh BSS sieve, and mixed with 10% by weight of tellurium dioxide, after which the catalyst was pelleted.

The cobalt molybdate/tellurium catalyst was placed in a reactor maintained at 365° C. A gaseous mixture of propylene (2% by volume), steam (10% by volume) and air (88% by volume) was passed over the catalyst, the contact time being 4 seconds. The reaction products were recovered by extraction of the effluent gases with water, followed by fractional distillation of the water solution.

43.6% of the propylene fed was converted to acrylic acid, 27.7% to acrolein and 9.6% to carbon dioxide. The yield of acrylic acid based on propylene consumed was 49.2%, and the combined yield of acrylic acid and acrolein based on propylene consumed was 80.5%.

EXAMPLE 6

Cobaltous nitrate (291 parts by weight) was dissolved in distilled water (120 parts by volume) and the solution heated to 60° C. Ammonium molybdate (176.6 parts by weight) was dissolved in distilled water (520 parts by volume) at 60° C. and the two solutions were quickly mixed and well stirred. Aqueous ammonia (5.0 N, 270 parts by volume) was added dropwise over 30 minutes, the temperature of the mixture being kept at 55 to 60° C., and the pH of the mixture not exceeding 7.0 during the precipitation. The mixture was stirred for a further 15 minutes, and the precipitate was filtered and washed twice by re-suspension in distilled water ($2 \times 750$ parts by volume). The precipitate was dried at 110° C., ground to about 8 mesh BSS and heated in air at 400° C. for 16 hours. The catalyst was then ground to pass a 30 mesh BSS sieve, pelleted and finally heated in air at 600° C. for 16 hours.

The cobalt molybdate catalyst was placed in a reactor maintained at 447° C. A gas mixture comprising 10% by volume of propylene, 40% by volume of steam and 50% by volume of air was passed over elemental tellurium maintained at the reaction temperature, and then over the catalyst. The mixture of gases passing over the catalyst contained $1.44 \times 10^{-4}$ grams of tellurium per litre of gas mixture. The contact time over the catalyst was 4 seconds. The reaction products were recovered from the effluent gases by extraction of water followed by fractional distillation.

28.6% of the propylene fed was converted to acrylic acid, 6.7% to acrolein and 5.6% to carbon dioxide. The yield of acrylic acid based on propylene consumed was 55%, and the combined yield of acrylic acid and acrolein based on propylene consumed was 68%.

EXAMPLE 7

A catalyst is prepared in the same way as described in Example 5, except that the cobalt molybdate is mixed with 10% by weight of finely ground elemental tellurium, after which the catalyst is pelleted.

The catalyst is placed in a reactor maintained at about 360 to 370° C. A gaseous mixture of propylene, (2% by volume), steam (10% by volume) and air (88% by volume) is passed over the catalyst, the contact time being 4 seconds. The reaction products are recovered by extraction of the effluent gases with water, followed by fractional distillation of the water solution.

The yields of acrylic acid and acrolein obtained are similar to those shown in Example 5.

We claim:

1. A process which comprises reacting in the vapor phase at a temperature of from about 300° to about 500° C. for from about 1 to about 30 seconds a feed mixture of an inert diluent, oxygen, and an olefin selected from the group consisting of propylene and isobutene, the proportion of the olefin in the mixture being between about 1 and about 20% by volume and the proportion of oxygen in the mixture being between about 1 and about 20% by volume, in the presence of a catalyst selected from the group consisting of cobalt molybdate with elemental tellurium and cobalt molybdate with a tellurium oxide, such catalyst containing from about 0.1% to about 50% by weight of tellurium, and producing a product selected from the group consisting of a mixture of acrylic acid and acrolein when propylene is used and a mixture of methacrylic acid and methacrolein when isobutene is used.

2. A process which comprises reacting in the vapor phase at a temperature of from about 300° to about 500° C. for from about 1 to about 30 seconds a feed mixture of an inert diluent, oxygen, and an olefin selected from the group consisting of propylene and isobutene, the proportion of the olefin in the mixture being between about 1 and about 20% by volume and the proportion of oxygen in the mixture being between about 1 and about 20% by volume, in the presence of a catalyst selected from the group consisting of cobalt molybdate with elemental tellurium and cobalt molybdate with a tellurium oxide, said feed mixture containing a substance selected from the group consisting of tellurium and oxides of tellurium in a quantity of about $1 \times 10^{-5}$ to $1 \times 10^{-2}$ grams of tellurium per litre, and producing a product selected from the group consisting of a mixture of acrylic acid and acrolein when propylene is used and a mixture of methacrylic acid and methacrolein when isobutene is used.

3. A process which comprises reacting in the vapor phase at a temperature of from about 300° to about 500° C. for from about 1 to about 30 seconds a mixture of propylene, an inert diluent, and air, the proportion of propylene in the mixture being between 1 and 20% by volume and the proportion of oxygen being between 1 and 20% by volume, in the presence of a catalyst selected from the group consisting of cobalt molybdate with elemental tellurium and cobalt molybdate with a tellurium oxide, such catalyst containing from about 0.1% to about 50% by weight of tellurium, to produce acrolein and acrylic acid.

4. A process which comprises reacting in the vapor phase at a temperature of from about 300° to about 500° C. for from about 1 to about 30 seconds a mixture of isobutene, an inert diluent, and air, the proportion of isobutene in the mixture being between 1 and 20% by volume and the proportion of oxygen between 1 and 20% by volume, in the presence of a catalyst selected from the group consisting of cobalt molybdate with elemental tellurium and cobalt molybdate with a tellurium oxide, such catalyst containing from about 0.1% to about 50% by weight of tellurium, to produce methacrolein and methacrylic acid.

5. A process which comprises reacting in the vapor phase at a temperature of from about 300° to about 500° C. for from about one to about thirty seconds a feed mixture of an inert diluent, oxygen, and an olefin selected from the group consisting of propylene and isobutene, the proportion of olefin in the mixture being between about 2 and about 10% by volume and the proportion of oxygen in the mixture being between about 2 and about 15% by volume, in the presence of a cobalt molybdate oxidation catalyst containing from about 0.1% to about 50% by weight of tellurium, and producing a product selected from the group consisting of a mixture of acrylic acid and acrolein when propylene is used and a mixture of methacrylic acid and methacrolein when isobutene is used.

References Cited by the Examiner

UNITED STATES PATENTS

| 2,653,138 | 9/1953 | Middleton | 252—439 |
| 3,009,943 | 11/1961 | Hadley et al. | 260—604 |
| 3,065,264 | 11/1962 | Koch et al. | 260—533 |
| 3,098,102 | 7/1963 | Bethell et al. | 260—533 |

LORRAINE A. WEINBERGER, *Primary Examiner.*

LEON ZITVER, *Examiner.*